Sept. 7, 1965
S. R. HOLLIDAY
3,204,621
SYSTEM FOR COMBUSTION ENGINE
Filed Jan. 16, 1964
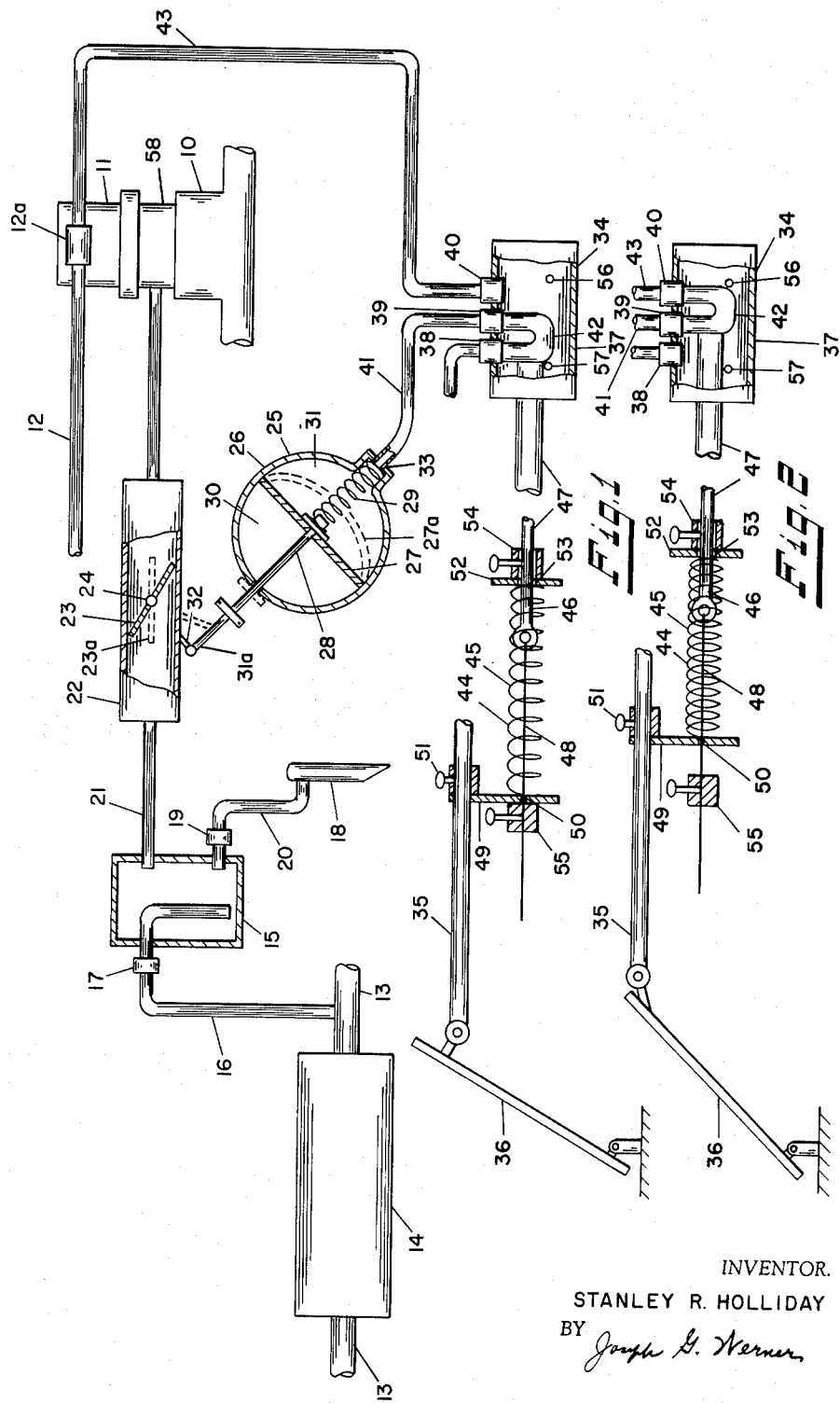
INVENTOR.
STANLEY R. HOLLIDAY
BY *Joseph G. Werner*
ATTORNEY

United States Patent Office 3,204,621
Patented Sept. 7, 1965

3,204,621
SYSTEM FOR COMBUSTION ENGINE
Stanley R. Holliday, 2005 E. Mifflin St., Madison, Wis.
Filed Jan. 16, 1964, Ser. No. 338,088
15 Claims. (Cl. 123—119)

My invention relates to an improved system for improving the operation of a combustion engine.

One object of my invention is to provide a system for a combustion engine which decreases the amount of fuel required by the engine without adversely affecting the acceleration or power of the engine.

Another object of my invention is to provide such a system which reduces the amount of nitrogen oxides discharged by the engine, thereby lessening the amount of smog produced by the engine.

Other objects and advantages of my invention will be apparent from the following detailed description taken in conjunction with the accompanying drawings, wherein a preferred embodiment of the principles of the invention has been selected for exemplification.

In the drawings:

FIG. 1 is a schematic diagram, partly in section, of my invention.

FIG. 2 is a schematic diagram, partly in section, of a portion of the controls for my invention.

A basic operation of my invention is the mixing of warm, moist air with a portion of the exhaust gases from a combustion engine, and the introduction of that mixture into the combustion chambers of the engine. The mixture is introduced into the chambers in such amounts as the engine requires at a particular load and speed.

My novel system may be used with any conventional combustion engine. A well known example of such an engine is the automobile engine illustrated partially and schematically in FIG. 1. The basic engine parts shown include an intake manifold 10, a carburetor 11, a carburetor vacuum line 12 extending between the carburetor 11 and the distributor (not shown), an exhaust pipe 13 and a muffler 14.

The warm air and the exhaust gases are mixed in an accumulator tank 15. A conduit 16 leads from the exhaust pipe 13 through a conventional metering valve 17 to the tank 15. The conduit 16 is preferably attached to the exhaust pipe 13 ahead of the muffler 14, and is preferably copper or some other heat conductive material to help cool the exhaust gases. The warm, moist air is obtained from the engine crankcase (not shown) through the crankcase breather pipe 18 and conduit 20 leading from the breather pipe 18 through a conventional metering valve 19 to the tank 15. The mixture of air and exhaust gases is conducted from the tank 15 through a conduit 21 and a valve 22 to a manifold adapter 58. The valve 22 is preferably a butterfly valve having a vane 23 rigidly mounted on a rotatable shaft 24. Thus, the conduit 16, breather pipe 18 and conduit 20, tank 15 and conduit 21 combine to provide conduct means for supplying exhaust gases and air from said engine directly to said intake manifold.

A vacuum power chamber 25 controls the position of the vane 23 to open and close the valve 22. The basic elements of the power chamber 25 include a housing 26, a flexible diaphragm 27, a rigid plunger 28 and a compression spring 29. The diaphragm 27 is secured within the housing 26 and divides it into two compartments 30 and 31. The diaphragm 27 substantially prevents the passage of fluids between the compartments 31 and 32. Extending through the compartment 30, the plunger 28 is attached to the diaphragm 27 and slidably projects through the housing 26. At its outer end 31a it is pivotally secured to an arm 32 which is fixedly secured to the shaft 24. The compression spring 29 extends within the compartment 31 between the diaphragm 27 and the housing 26. An outlet 33 projects from the compartment 31.

The power chamber 25 is intermittently exposed to the vacuum in the carburetor vacuum line 12 by the operation of a control valve 34. In a preferred embodiment, the valve 34 comprises a shell 37 having a vent 38 open to the atmosphere, an inlet 39 connected by a conduit 41 to the outlet 33 of the power chamber 25, and an outlet 40 connected to the carburetor vacuum line 12 at T-joint 12a by means of vacuum conduit 43. A substantially U-shaped tube 42 is slidably mounted within the shell 37 and is moved by the rod 35, to which it is rigidly secured. The tube 42 has two positions. Either it may be in communication with the vent 38 and inlet 39 as shown in FIG. 1, or it may be in communication with the inlet 39 and outlet 40 as shown in FIG. 2.

The U-shaped tube 42 of valve 34 may be controlled by the illustrated spring means 44 operatively associated with the rod 35 attached to the throttle or gas pedal 36 of the engine, by a solenoid (not shown) operated by a switch on the gas pedal 36 or rod 35, or by other suitable means. The illustrated spring means 44 includes a compression spring 45, a tube control rod 46 (which may include a rigid rod 47 and a control wire 48 as shown) which is attached to the tube 42, a bracket member 49 including an aperture 50 for receiving the control wire 46 in slidable relation and a set screw 51 for engaging the rod 35 or other engine throttle linkage attached to the throttle or gas pedal 36 in fixed relation, a bearing plate 52 having an aperture 53 for slidably engaging rigid rod 47, a clamp 54 for fixedly engaging the rigid rod 47 to limit the movement of the bearing plate 52 on the rod 47, and a clamp 55 for fixedly engaging the control wire 48 to limit the sliding movement of the bracket 49 with respect to the wire 48.

When the gas pedal is depressed as shown in FIG. 2, the bracket 49 moves with the rod 35 away from the clamp 55 and compresses the spring 45 against the bearing plate 52. The bearing plate 52 in turn is pressesd against the clamp 54 rigidly attached to the rod 47 to move the clamp 54, the rod 47 and the tube 42 to the position shown, wherein it connects inlet 39 and outlet 40. Such movement is limited by a stop 56 or other suitable means to prevent the tube 42 from traveling beyond inlet 39 and outlet 40. As the gas pedal 36 is depressed further, the bracket 49 merely continues to slide along the control wire 48 and further compresses the spring 45 without changing the position of the slide 42.

When the gas pedal 36 is released, it is returned to the position shown in FIG. 1 by a conventional spring (not shown) attached to the rod 35, or by other conventional attached linkage. As the gas pedal 36 and rod 35 return to the position of FIG. 1, the bracket 49 slidably moves along the control wire 48 toward the clamp 55 to reduce the tension in the spring 45. When the bracket 49 reaches the clamp 55, it pulls the clamp 55, the control wire 48, the rigid rod 47 and the attached tube 42 to the position shown in FIG. 1, wherein the tube 42 connects the vent 38 and the inlet 39. Such movement may be limited by conventional gas pedal linkage, by a stop 57 as shown, or by other suitable means.

The bracket 49, and clamps 54 and 55 are adjustable on their supporting members to effectively coordinate the movement of the tube 42 with the speed of the engine. Preferably, the mechanism is adjusted so that the tube 42 is in the position illustrated by FIG. 1 when the engine is idling, and is in the position illustrated by FIG. 2 when the engine is operated at a pre-determined speed above idle. Typically, the mechanism might be adjusted so that the slide 42 will reach the position of FIG. 2 when an automobile driven by the engine is operated at a speed of 15 miles per hour or more in high gear. It is understood that the illustrated embodiment of valve 34 is exemplary only, and that many suitable three way valves could be employed by those skilled in the art to selectively connect conduit 41 with conduit 43 or the atmosphere.

When the engine is in operation, some of the exhaust gases are diverted by the conduit 16 from the exhaust pipe 13 to the tank 15. In the tank 15 the diverted exhaust gases are mixed with warm, moist crankcase air supplied by the breather pipe 18 and the conduit 20. At the start of engine operation, when the engine and the tank 15 are cool, a small amount of water from the air and the exhaust gases may condense in the tank 15. That water will be evaporated as soon as the engine and the exhaust gases become warm.

The passage of the mixture of exhaust gases and air from the tank 15 to the manifold adapter 58 and the intake manifold 10 may be conveniently described for three operating conditions of the engine: idle, substantially constant operating speed and acceleration.

At idle, which is the condition illustrated in FIG. 1, the tube 42 of the valve 34 connects the vent 38 and inlet 39. The compartment 31 of the power chamber 25 is exposed to atmospheric pressure through a circuit comprising the outlet 33, and conduit 41, the inlet 39, the tube 42 and the vent 38. Since the compartment 30 is at atmospheric pressure, there is no net fluid pressure on the diaphragm 27. The compresion spring 29 biases the diaphragm 27, and thereby the plunger 28 and the arm 32, to the illustrated position in which the vane 23 of the valve 22 is closed. At idle, therefore, none of the mixture of air and exhaust gases is introduced into the combustion chambers of the engine.

When the engine is running at a steady speed, the U-shaped tube 42 is positioned as illustrated in FIG. 2, and connects the inlet 39 and outlet 40. That exposes the compartment 31 to the carburetor vacuum line 12 through a circuit which includes the outlet 33, the conduit 41, the inlet 39, the tube 42a, the outlet 40, the conduit 43 and T-joint 12a. The resulting difference in air pressures between the compartments 30 and 31 moves the diaphragm 27 to the position illustrated by phantom lines 27a in FIG. 1 thereby causing the plunger 28 and the arm 32 to rotate the vane 23 to the position illustrated by phantom lines 23a and open the valve 22. Consequently, at steady speed, the mixture of moist air and exhaust gases is introduced into the combustion chambers of the engine in relative proportions determined by metering valves 17 and 19.

During acceleration of the engine or when the engine is under heavy load, the amount of vacuum in the carburetor vacuum line 12 diminishes. The vacuum in compartment 31 also decreases, allowing the spring 29 to force the diaphragm toward the position illustrated by solid lines in the FIG. 1. As a result, the vane 23 is moved to a position in which it partially, but not completely, closes the valve 22. Thus, during acceleration and other operating conditions which cause diminished vacuum, a restricted flow of the mixture of air and exhaust gases passes to the combustion chambers of the engine.

An important feature of my novel system may be noted from this operation of the valve 22. During operation of the engine, the passage of the mixture of air and exhaust gases to the engine combustion chambers depends on the amount of vacuum in the carburetor vacuum line 12. Therefore, the proper amount of the mixture for the conditions existing in the engine is introduced into the combustion chambers. In effect, the conditions in the engine control the passage of the exhaust gas and air mixture to it.

The advantages of this vacuum control of the flow of the mixture are many. The addition of the proper amount of the mixture of exhaust gases and air increases gasoline mileage. The smog which might be produced by the exhaust gases is decreased. The oxides of nitrogen comprise some of the more important components of smog, and the carbon dioxide in the mixture of exhaust gases and air supplied to the cylinders by my system decreases the production of those oxides by smothering the combustion fire more quickly after the completion of the power stroke of the pistons. Because of the quick smothering of the combustion fire, the temperature of the combustion chamber is less. Where the only interest is the reduction of smog, the addition of air to the exhaust gases in tank 15 may be eliminated. Only the exhaust gases are then fed to the engine combustion chambers.

Yet another advantage of my system is its ability to increase gasoline mileage while still permitting quick, powerful acceleration. When the engine is accelerated or under heavy load the flow of the mixture of air and exhaust gases is restricted, producing a higher ratio of fuel to the mixture. That higher ratio insures rapid acceleration and full power. A further advantage of my system is that it will often allow the use of regular gas where premium gas would otherwise be required since it will reduce detonation in the internal combustion engine. My system is also economical and easy to install. The only modification required of an existing engine is the addition of the manifold adapter 58a to the intake manifold 10, the connection of conduits 16 and 20 to the exhaust pipe 13 and breather pipe 18, respectively, the attachment of bracket 49 to the gas pedal rod 35, and the insertion in carburetor vacuum line 12 of T-joint 12a. All of these modifications are minor.

It is understood that my invention is not limited to the particular construction and arrangement of parts illustrated and described herein, but embraces all such modified forms thereof as come within the scope of the following claims.

I claim:

1. In a combustion engine having an intake manifold, a carburetor, and a carburetor vacuum line, a system for improving the operation thereof, comprising:
   (a) conduit means to supply exhaust gases and air from said engine directly to said intake manifold,
   (b) valve means for opening said conduit means in response to high vacuum conditions in the carburetor vacuum line of said engine and for closing said conduit means in response to low vacuum conditions therein,
   (c) said valve means being operable at engine speeds in excess of a predetermined speed above idle.

2. In combination with an engine having an intake manifold, a carburetor, a carburetor vacuum line, an exhaust pipe and a crankcase, a system for improving the operation of said engine which comprises,
   (a) a tank,
   (b) first conduit means leading from said exhaust pipe to said tank,
   (c) second conduit means for supplying air to said tank,
   (d) a third conduit means leading from said tank to said intake manifold,
   (e) a valve adapted to open and close said third conduit means,
   (f) said valve being operable in response to vacuum conditions in the carburetor vacuum line of said engine.

3. In a combustion engine having an intake manifold, a carburetor, a carburetor vacuum line, an exhaust pipe and a crankcase breather, a system comprising:
(a) a tank,
(b) a first conduit adapted to conduct exhaust gases from said exhaust pipe to said tank,
(c) a second conduit adapted to conduct air from said crankcase breather to said tank,
(d) a third conduit leading from said tank to said intake manifold,
(e) a valve adapted to open and close said third conduit,
(f) means to actuate said valve,
(g) said actuating means responding to vacuum conditions in the said carburetor vacuum line to control said valve.

4. The invention of claim 3 wherein a fourth conduit extends from said actuating means to said carburetor vacuum line, and wherein said actuating means opens the valve more fully when the vacuum increases, and less fully when the vacuum decreases.

5. The invention described in claim 3 wherein first and second metering valves are inserted in the first and second conduits, respectively, said metering valves being adapted to proportion the relative amounts of exhaust gases and air conducted to the tank.

6. In a combustion engine having an intake manifold, a carburetor, a carburetor vacuum line, an exhaust pipe and a crankcase breather, a system comprising:
(a) a tank,
(b) a first conduit leading from said exhaust pipe to said tank,
(c) a second conduit leading from said crankcase breather to said tank,
(d) a third conduit leading from said tank to said intake manifold,
(e) a valve adapted to open and close said third conduit,
(f) carburetor vacuum operated means to actuate said valve,
(g) means for creating a partial vacuum in said actuating means.

7. The invention of claim 6 wherein said actuating means comprises:
(a) a diaphragm adapted to be exposed on one side to atmospheric pressure and on the other side to the created vacuum,
(b) a plunger connected to said diaphragm and being adapted to actuate the valve,
(c) spring means adapted to urge said diaphragm toward a position in which said plunger closes said valve,
(d) said diaphragm being adapted to move against said spring means to move said plunger and open said valve when one side thereof is exposed to the vacuum.

8. The invention of claim 6 wherein:
(a) said actuating means comprises a diaphragm enclosed in a housing, a plunger and spring means,
(b) said plunger is connected to said diaphragm and is adapted to actuate said valve,
(c) said diaphragm has a first position wherein said plunger opens said valve and a second position wherein said plunger closes said valve,
(d) said diaphragm is adapted to be forced toward said first position when air is partially withdrawn from the portion of said housing in communication with one side of said diaphragm to create a partial vacuum, and
(e) said diaphragm is adapted to be forced toward said second position by said spring means when air is partially readmitted to said portion of said housing.

9. The invention described in claim 6 wherein the means for creating a partial vacuum in said actuating means comprises:
(a) a fourth conduit extending from the carburetor vacuum line to the actuating means, and
(b) valve means for selectively opening and closing said fourth conduit.

10. The invention described in claim 9 wherein said valve means includes means for connecting said actuating means with the atmosphere when said fourth conduit in closed.

11. The invention described in claim 9 wherein said valve means are controlled by spring means operatively associated with the throttle of the engine whereby said valve means will close said fourth conduit when the engine is idling, and will open said fourth conduit when the engine speed is increased to a predetermined level above idle.

12. In a combustion engine having an intake manifold, a carburetor, a carburetor vacuum line and an exhaust pipe, a system comprising:
(a) a tank,
(b) a first conduit leading from said exhaust pipe to said tank,
(c) a second conduit leading from said tank to said intake manifold,
(d) a valve adapted to open and close said second conduit,
(e) means to actuate said valve,
(f) means adapted to selectively create a partial vacuum in comunication with said actuating means,
(g) said actuating means being adapted to actuate said valve to open said second conduit when said vacuum is created and to close said conduit when said vacuum is replaced with air.

13. The invention of claim 12 wherein:
(a) said actuating means comprises a diaphragm enclosed in a housing, a plunger and spring means,
(b) said plunger is connected to said diaphragm and is adapted to actuate said valve,
(c) said diaphragm has a first position wherein said plunger opens said valve and a second position wherein said plunger closes said valve,
(d) said diaphragm is adapted to be forced toward said first position when air is partially withdrawn from the portion of said housing in communication with one side of said diaphragm to create a partial vacuum, and
(e) said diaphragm is adapted to be forced toward said second position by said spring means when air is partially readmitted to said portion of said housing.

14. The invention described in claim 12 wherein said means to selectively create a partial vacuum in communication with said actuating means comprises:
(a) valve means having a vent in communication with the atmosphere, an inlet and an outlet,
(b) a third conduit extending from the carburetor vacuum line to said outlet,
(c) a fourth conduit extending from said inlet to said actuating means,
(d) a valve member located within said valve means and being selectively movable between a first position wherein said inlet and said outlet are in communication and a second position wherein said vent and said inlet are in communication, and
(e) means for selectively moving said valve member between said first and second positions.

15. The invention described in claim 14 wherein the means for selectively moving the valve member comprises:
(a) rod means attached to said valve member,
(b) first clamp means and second clamp means adjustably secured to said rod means in spaced relation,
(c) a compression spring extending along said rod means between said first and second clamp means,
(d) bearing means slidably engaging said rod means and being adapted to be pressed against said second clamp means by said spring,
(e) bracket means slidably engaging said rod means between said first clamp means and said spring,
(f) said bracket means being attached to the throttle linkage of said engine in fixed relation,
(g) said bracket means being adapted to press against said spring when said throttle linkage is depressed to force said bearing means, said second clamp and said rod means to move said valve member to its said second position, and
(h) said bracket means being further adapted to engage said first clamp when said throttle linkage is released to force said first clamp and said rod means to move said valve member to its said first position.

References Cited by the Examiner

UNITED STATES PATENTS

| | | | |
|---|---|---|---|
| 1,714,156 | 5/29 | Broncato | 123—119 |
| 2,543,194 | 2/51 | Paris | 123—119 |
| 2,700,967 | 2/55 | Maker | 123—119 |
| 2,889,904 | 6/59 | Martinoli | 123—119 |

KARL J. ALBRECHT, *Primary Examiner.*